(12) United States Patent
Chamot et al.

(10) Patent No.: US 6,257,493 B1
(45) Date of Patent: Jul. 10, 2001

(54) CARTRIDGE FOR A MIXER TAP WITH TEMPERATURE LIMITATION

(75) Inventors: Jean Chamot, Arpajon; Christian Mace, Vert le Grand, both of (FR)

(73) Assignee: Vernet S.A., Arpajon Cedex (FR)

( * ) Notice: Subject to any disclaimer, the term of this patent is extended or adjusted under 35 U.S.C. 154(b) by 0 days.

(21) Appl. No.: 09/560,283

(22) Filed: Apr. 27, 2000

(30) Foreign Application Priority Data

Apr. 28, 1999 (FR) .................................................. 99 05389

(51) Int. Cl.⁷ .................................................. G05D 23/13
(52) U.S. Cl. .................................................. 236/12.13
(58) Field of Search .............................. 236/12.13, 12.14

(56) References Cited

U.S. PATENT DOCUMENTS

| 2,296,266 | * | 9/1942 | Breckenridge | 236/12.13 |
| 2,932,453 | * | 4/1960 | Dillman | 236/12.13 |
| 3,001,717 | * | 9/1961 | Rimsha et al. | 236/12.13 |
| 4,669,653 | * | 6/1987 | Avelov | 236/12.13 |
| 5,494,077 | * | 2/1996 | Enoki et al. | 137/625.17 |
| 5,647,531 | * | 7/1997 | Kline et al. | 236/12.14 |
| 5,904,291 | * | 5/1999 | Knapp | 236/12.14 |

FOREIGN PATENT DOCUMENTS

| 29 45 879 | 5/1981 | (DE) . |
| 2 424 459 | 11/1979 | (FR) . |
| 93 02308 | 2/1993 | (WO) . |
| 97 21949 | 6/1997 | (WO) . |

* cited by examiner

*Primary Examiner*—William E. Tapolcai
(74) *Attorney, Agent, or Firm*—Wenderoth, Lind & Ponack, L.L.P.

(57) ABSTRACT

The invention relates to a reverse-flow cartridge comprising a body (1) at which a cold fluid inlet duct (F), a hot fluid inlet duct (C) and a duct (M) for discharging mixed fluid terminate.

According to the invention, a bypass (B) connects the cold fluid inlet and mixed fluid outlet ducts, and the cartridge is equipped with a device (7, 8) for shutting off the bypass, this device comprising a thermostatic element (7) equipped with a shut-off element (74) for shutting off the bypass as long as the temperature of the discharged fluid remains below or equal to a predetermined temperature and uncovering the bypass when the temperature of the fluid becomes higher than this temperature so as then to cause fluid to flow from the cold fluid inlet duct (F) to the discharge duct (M) through the bypass (B).

The invention can be used in particular in water-distribution installations.

39 Claims, 3 Drawing Sheets

CARTRIDGE FOR A MIXER TAP WITH TEMPERATURE LIMITATION

The invention relates to mixer taps and more particularly to cartridges for mixer taps of the so-called reverse-flow type.

Mixer taps are taps which comprise a cartridge comprising a body into which there extend and in which there terminate a first fluid inlet duct for conveying fluid at a first temperature into the body, a second fluid inlet duct for conveying fluid at a second temperature higher than the first into the body and a fluid discharge duct for discharging from the body a so-called "mixed" fluid at a desired temperature falling in the range extending from the first to the second temperature, resulting from a mixing of the two streams, one coming from each of the two fluid inlet ducts, in varying proportions.

The cartridge has a single operating member, generally consisting of a lever which is somewhat inclined with respect to the central longitudinal axis of the cartridge and intended to be manipulated by the user of the tap for selecting both the temperature and the flowrate of the mixed fluid; in general, turning the lever about this axis alters the temperature of the mixed fluid, and tipping the lever in one and the same vertical plane alters the fluid flowrate; a combination of the two movements allows both the temperature and the flowrate to be altered simultaneously; in general also, the proportion of the mixture can vary from practically 100%/0% to 0%/100%, which means that the temperature of the fluid can vary from "fully cold" to "fully hot".

As these taps are commonly used in domestic water-distribution installations, in which the apparatus producing hot water produces water the temperature of which can be as much as about 80° C., there are real risks of relatively severe scalding.

To remedy this drawback, it is possible to provide a limit stop to prevent the lever from being turned any further before the cold water inlet duct is fully shut off, which makes it possible to limit the temperature of the mixed water at the "hot" end. However, the temperature reached when the stop is encountered depends on the ratio of the cold water and hot water supply pressures and on the flowrate; in particular, under certain conditions (hot water pressure greater than cold water pressure) the maximum temperature may practically reach the temperature of the hot water, and the risk of scalding therefore remains.

The object of the invention is therefore to overcome the drawbacks of the known mixer taps and the invention therefore relates to a cartridge for a reverse-flow mixer tap comprising a body in which there terminate a first fluid inlet duct for conveying fluid at a first temperature into the body, a second fluid inlet duct for conveying fluid at a second temperature higher than the first temperature into the body, and a fluid discharge duct for discharging fluid at a desired temperature in the range extending from the first temperature to the second temperature from the body, the cartridge being characterized in that it comprises a bypass connecting the first inlet duct to the discharge duct and is equipped with a device for shutting off the bypass comprising a thermostatic element equipped with a shut-off element designed to shut off the bypass as long as the temperature of the discharged fluid remains below or equal to a predetermined set temperature, and to uncover the bypass when the temperature of the discharged fluid exceeds this temperature, so as then to cause fluid to flow from the first inlet duct to the discharge duct through the bypass.

By virtue of the thermostatic element, the flow of top-up fluid through the bypass for setting to a low temperature intended to make the tap safer to operate is set directly according to the temperature of the fluid passing through the discharge duct.

The cartridge may additionally exhibit one or more of the following features:

the first fluid inlet duct for conveying fluid at a first temperature into the body and the fluid discharge duct for discharging fluid at a desired temperature from the body, extend in a first direction, and the bypass extends in a direction perpendicular to this first direction;

the thermostatic element comprises a flange and this flange forms the shut-off element designed to shut off the bypass as long as the temperature of the discharged fluid remains below or equal to a predetermined set temperature and to uncover the bypass when the temperature of the discharged fluid exceeds this temperature;

the shut-off device comprises a washer-shutter slipped around the thermostatic element, and this washer-shutter forms the shut-off element designed to shut off the bypass as long as the temperature of the discharged fluid remains below or equal to a predetermined set temperature, and to uncover the bypass when the temperature of the discharged fluid exceeds this temperature;

the shut-off device comprises a plug slipped around the thermostatic element, and this plug forms the shut-off element designed to shut off the bypass as long as the temperature of the discharged fluid remains below or equal to a predetermined set temperature, and to uncover the bypass when the temperature of the discharged fluid exceeds this temperature;

it comprises a body forming a housing containing a skirt into which there extend and in which there terminate the first inlet duct, the second inlet duct, and the discharge duct, along with the bypass connecting the first inlet duct and the discharge duct and which is equipped with the device for shutting off the bypass;

it comprises a conventional mixer tap cartridge without bypass or device for shutting off the bypass, comprising a housing and a temperature-limiting adapter comprising a housing, the body forming a housing consists of the housing of the conventional cartridge and of the housing of the adapter consisting of a skirt through which the first inlet duct, the second inlet duct and the discharge duct pass, these ducts terminating in the housing of the conventional cartridge, and the adapter also comprises the bypass connecting the first inlet duct and the discharge duct and is equipped with the device for shutting off the bypass;

it is of the disc type, for example having ceramic discs;

it is of the type with cylindrical surfaces, the cartridge being of the piston type;

it is of the type with spherical surfaces, the cartridge being of the ball type.

Other features and advantages of the invention will emerge from the description which will follow, of some embodiments of the invention which are given by way of non-limiting example and which are illustrated by the appended drawings, in which.

Figure 1:
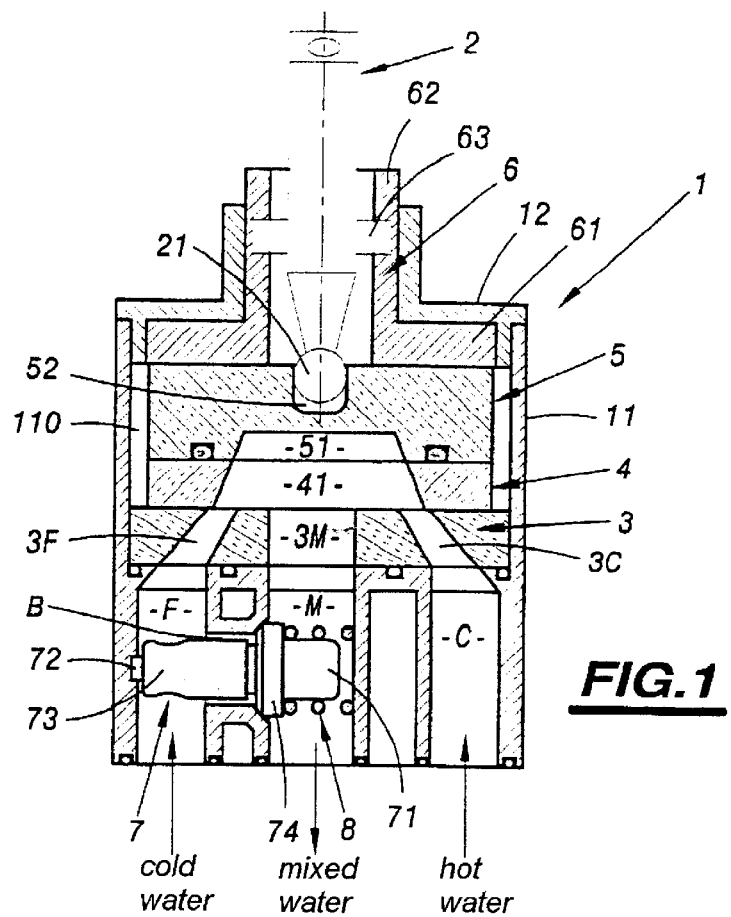
FIG. 1 is a diagrammatic view in longitudinal section of a first embodiment of a cartridge for a mixer tap according to the invention, the components of which are depicted in a position in which the fluid passing through the discharge duct is at a temperature such that the shut-off element shuts off the bypass.
Figure 2:
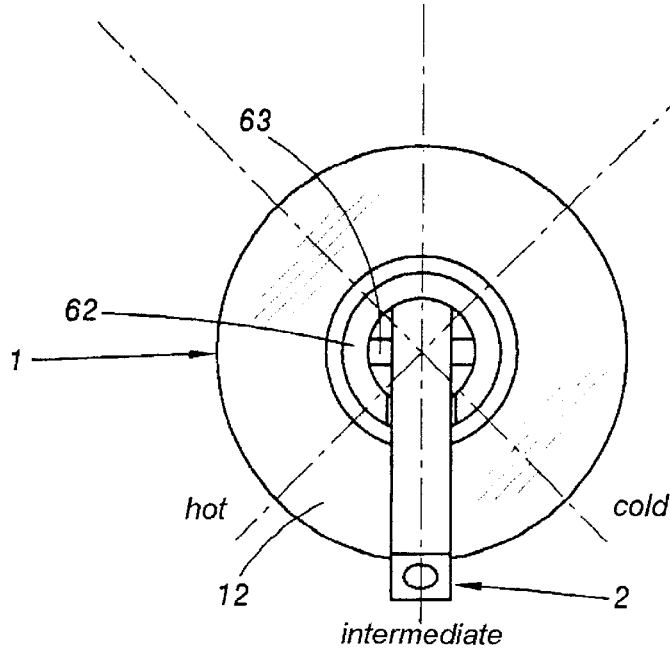
FIG. 2 is a diagrammatic view from above of the cartridge corresponding to FIG. 1.
Figure 3:
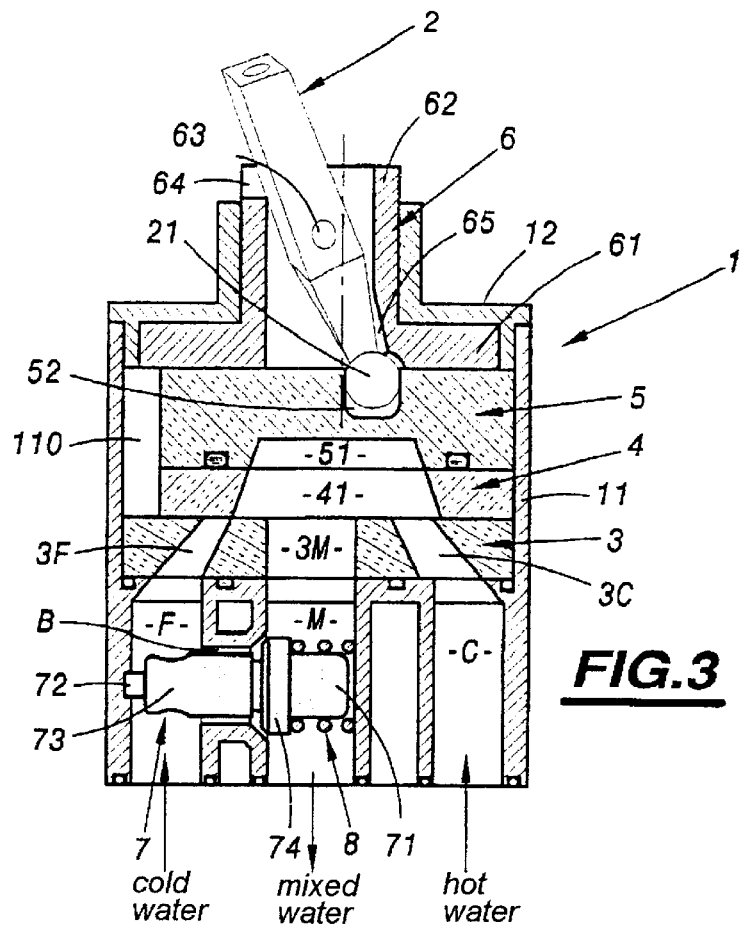
Figure 4:
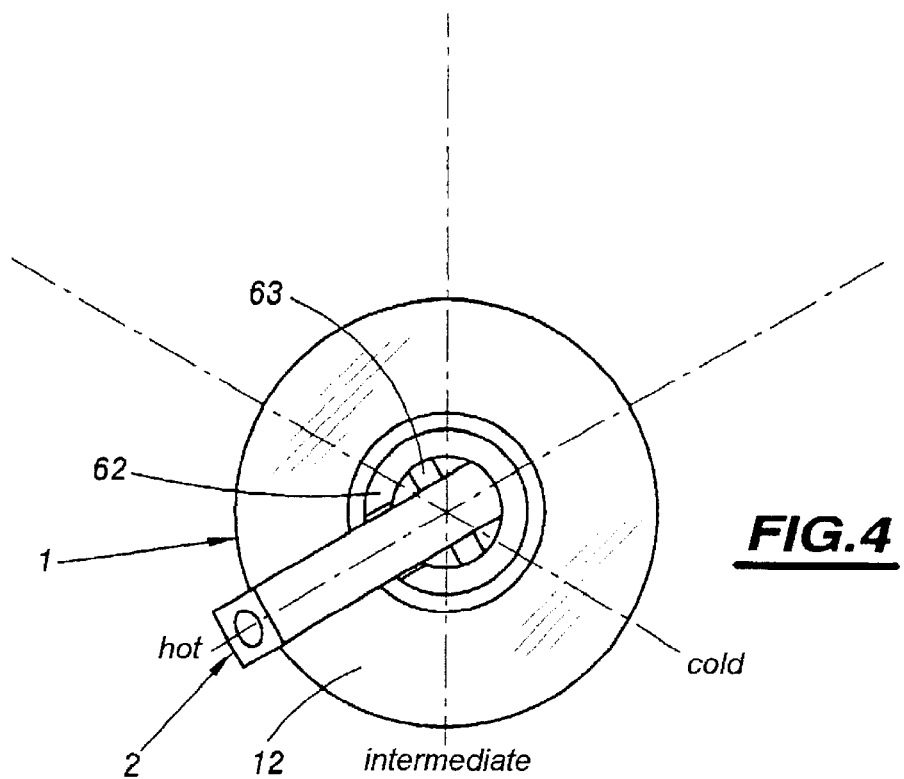
Figure 5:
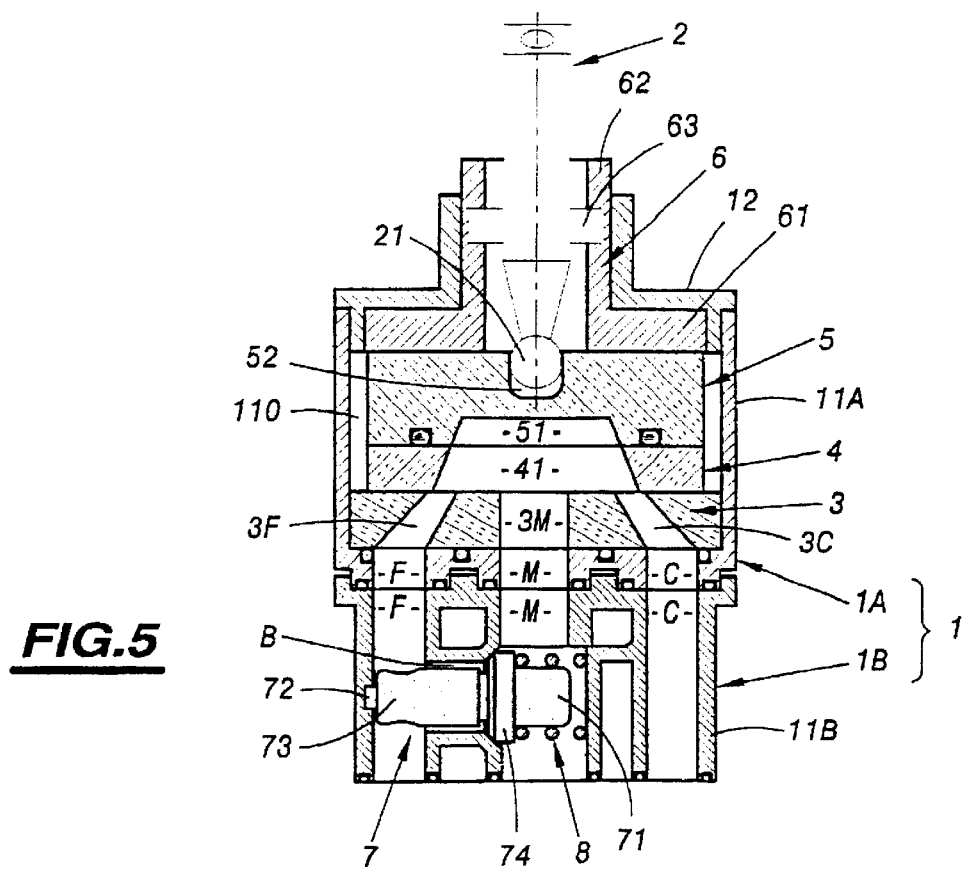
Figure 6:
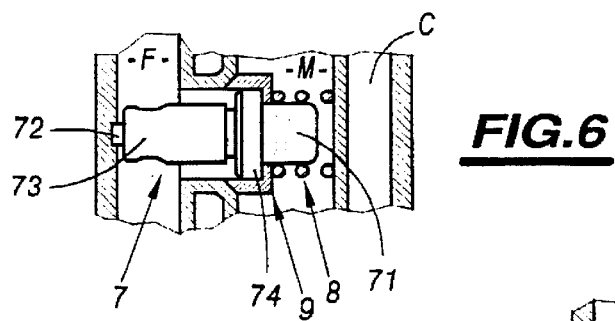

FIG. 3 is a diagrammatic view in longitudinal section of the cartridge of FIG. 1, the components of which are depicted in a position in which the fluid passing through the discharge duct is at a temperature such that the shut-off element uncovers the bypass, FIG. 4 is a diagrammatic view from above of the cartridge corresponding to FIG. 3, FIG. 5 is a diagrammatic view in longitudinal section of a second embodiment of a cartridge for a mixer tap according to the invention, the components of which are depicted in a position in which the fluid passing through the discharge duct is at a temperature such that the shut-off element shuts off the bypass, FIG. 6 shows an alternative assembly of the shut-off device which applies to the embodiments of FIGS. 1 to 5, and FIG. 7 shows another alternative assembly of the shut-off device, in which the shut-off element is a plug, rather than a shutter as in FIG. 6.

The mixer tap cartridge depicted diagrammatically in the drawings, intended to be fitted to water supply taps particularly for domestic installations, is of the ceramic disc type, but the invention applies to all types of reverse-flow cartridge.

This cartridge comprises a body 1 forming a housing containing a skirt 11, here externally of cylindrical overall shape and, at one end of the skirt, a stopper 12 fixed to it, for example, by being screwed into it, and having a central opening for the passage of a lever 2 intended to be manipulated by the user of the tap in order to control the flowrate and the temperature of the water delivered by the cartridge, therefore by the tap.

Extending into and terminating in the skirt 11 of the body 1 are a first inlet duct F designed to convey into the body, in this instance, water at a first temperature (termed "cold water" in the remainder of the description), a second inlet duct C designed to convey into the body, in this instance, water at a second temperature higher than the first (termed "hot water" in the remainder of the description), and a discharge duct M for discharging from the body, in this instance, water at a desired temperature in the range extending from the first temperature to the second temperature (termed "mixed water" in the remainder of the description); these three ducts F, C, M are defined in the skirt by appropriately-located internal partitions thereof, in this instance interrupted approximately mid-way along the length of the skirt to define therein an internal space 110 into which the three ducts open.

As a preference, the three ducts F, C, M open into the internal space 110 of the skirt 11 in one and the same plane perpendicular to the longitudinal central axis of the skirt and in this instance extend in the direction of this axis, this plane being embodied by the end edge faces of the partitions defining the ducts. For example, the discharge duct M is centred on and extends around the longitudinal central axis of the skirt, and the inlet ducts F and C extend on either side of it.

One face, in this instance a flat face, of a ceramic disc 3 held stationary in the internal space 110 of the skirt, is held against the end edge faces of the partitions; this ceramic disc, in this instance circular, is pierced with three throughholes 3F, 3C, 3M which extend the ducts for F, C, M, respectively; the stationary disc 3 and the end edge faces of the partitions are pressed together in leak-tight contact by means of O-rings housed in grooves cut in these edge faces and running circumferentially one of them around the orifice via which the discharge duct M opens and another concentrically around the series of three respective orifices for the three ducts.

The two faces of the stationary disc 3 are parallel, and the opposite face to the one held against the end edge faces of the partitions of the ducts acts as a bearing surface which guides the sliding of a flat face of a mobile ceramic disc 4 which is held against it, which mobile disc 4 is secured to the operating lever 2 and acts as a selective shut-off element for the holes 3F, 3C of the stationary disc. In order to be able to be mobile while remaining held against the stationary disc 3, the disc 4, in this instance circular, has a diameter smaller than that of the disc 3 and is held against the latter disc by a device which will be described later on. In order for it to be able selectively to uncover the holes of the stationary disc, its face which is held against this disc has a cut-out 41, in this instance a central cut-out which may pass all the way through and which, uncovering them partially and to equal extent, connects the inlet holes 3F, 3C, passing via the discharge hole 3M which itself is completely uncovered, when the mobile disc 4 is centred on the central longitudinal axis of the skirt (FIGS. 1 and 2); when, starting from this central position, the mobile disc 4 is actuated, along a diameter of the disc 3 equidistant from the inlet holes 3F, 3C, in a first direction, the cut-out 41 increasingly uncovers (until it completely uncovers) these inlet holes without ceasing to completely uncover the discharge hole; when it is actuated in the opposite direction, it increasingly shuts off (until it completely shuts off) the inlet holes, also without ceasing to entirely uncover the discharge hole; when, starting from a previously defined position (for example the position of FIGS. 1 and 2), the mobile disc 4 is actuated along an arc of circumference in a first direction, the cold water inlet hole 3F is increasingly shut off and the hot water inlet hole 3C is increasingly uncovered (FIGS. 3 and 4), and when it is actuated in the opposite direction, the cold water inlet hole is increasingly uncovered and the hot water inlet hole is increasingly shut off, still without ceasing to entirely uncover the discharge hole. Thus, by actuating a single operating member 2, it is possible to obtain a mixture of the two streams, one from each of the two inlet ducts F, C as a variable flowrate and in variable proportions, a tilting of the lever causing a rectilinear translational movement of the mobile disc, essentially altering the flowrate of the discharged water, and a turning of the lever causing the mobile disc to turn, essentially altering the temperature of the discharged water.

The mobile disc 4 is secured to the operating lever 2 via an actuating disc 5 held against and fixed against the opposite face of the mobile disc 4 to the one which bears and slides against a face of the stationary disc 3, and which is parallel thereto. If the cut-out 41 of the mobile disc 4 goes all the way through, the face of the actuating disc 5 which is held against it may itself have a cut-out 51 extending that of the disc 4; in this same instance, the mobile disc 4 and the actuating disc 5 are pressed together in leak-tight contact by means of an O-ring housed in a groove cut in the same face of the actuating disc and extending circumferentially around its cut-out 51. The actuating disc 5 is connected to the lever 2 by the fact that its face opposite and parallel to the one held against the mobile disc 4 has a cavity 52, and the lever 2 at its free end entering the body 1 has a peg 21, in this instance of approximately spherical shape, fitted into the cavity 52 to form a ball-joint connection; in order not to impede the movements of the mobile disc, the contour of the actuating disc does not protrude beyond the contour of the mobile disc.

The device allowing the mobile disc 4 to be held against the stationary disc 3 comprises a pivoting thrust bearing 6 consisting, in a single piece, of a thrust disc 61 housed in the volume defined by the skirt 11 of the housing 1 and a barrel 62 housed in the central opening of the stopper 12, this thrust bearing 6 having a through-hole extending along and around the longitudinal central axis of the housing, for the passage of the lever 2. The thrust disc 61 has a flat face held against the actuating disc 5 and acting as a bearing surface for guiding the sliding thereof when moved in translation and/or turned by the lever 2. The thrust bearing 6 also bears a shaft 63 extending diametrically across its through-hole, about which shaft the lever 2 is articulated; in addition, the free end of the barrel 62 has one or more scallops 64 allowing the lever 2 to be inclined as far as needed in order to move the actuating disc 5 and the ceramic mobile disc 4 as far as their extreme positions; for the same reason, the hole passing through the pivoting thrust bearing 6 may have a recess 65 of appropriate shape in its region near the cavity 52 of the actuating disc 5.

By virtue of this arrangement, simply pivoting the lever 2 about the longitudinal axis of the shaft 63 causes a rectilinear translation of the actuating disc 5 and of the mobile disc 4 and thus modifies the flowrate through the discharge duct, and simply turning the lever with a fixed inclination, leading to the longitudinal axis of the shaft 63 being turned about the longitudinal central axis of the cartridge simply causes the actuating disc and the mobile disc to turn, and thus modifies the proportion of the mixture, which can normally vary from 100%/0% to 0%/100%.

However, according to the invention, the cartridge further comprises a bypass B connecting the first cold water inlet duct F to the mixed water discharge duct M, and is equipped with a device for shutting off the bypass B, this device comprising a thermostatic element 7 equipped with a shut-off element designed to shut off the bypass as long as the temperature of the discharged fluid remains below or equal to a predetermined set temperature, and to uncover the bypass when the temperature of the discharged fluid exceeds this temperature so as then to cause fluid to flow from the first duct F into the discharge duct M through the bypass.

The thermostatic element 7 is of the expanding wax type, that is to say comprises a chamber or cup 71 containing a mass of expandable wax and which communicates with an end region of a piston 72 capable of moving in longitudinal translation, the end face of which piston rests against the mass of wax; the piston is guided in a cylinder surrounded by a protective boot 73 made of elastomeric material and know as a cuff also surrounding the piston over part of its length without reaching its free end furthest from the cup; the cup carries an external flange 74 in the region near the cylinder which guides the piston, at the opposite end to its free end, and, on the cylinder side, this flange has a short end region with an approximately frustoconical or spherical surface, so that it can act as a shutter.

In the embodiment of FIGS. 1 to 4, the bypass consists in a hole of circular cross section passing through the partition separating the first inlet duct F and the discharge duct M. This hole is cylindrical over most of its length, with a diameter slightly exceeding that of the cylinder/boot assembly of the thermostatic element, and has a frustoconical or spherical region which, widening, opens into the discharge duct M and extends over a range of diameters including the diameters of the approximately frustoconical or spherical end region of the flange 74 of the thermostatic element 7. In this instance, the cylindrical bypass extends around a longitudinal axis perpendicular to the direction in which the cold water inlet duct F and mixed water discharge duct M extend. The cylinder/boot assembly of the thermostatic element is placed in the bypass B such that, for the predetermined set temperature, the piston 72 rests against that part of the wall of the first duct F which lies opposite the bypass and such that the approximately frustoconical or spherical surface region of the flange 74 thus forming a shut-off shutter, rests against the frustoconical region of the bypass, which forms a seat, the heat-sensitive part, namely the cup 71, of the element 7 protruding into the mixed water discharge duct M, some distance away from that part of the wall of this duct which lies opposite the bypass; an elastic member 8 such as a helical spring slipped around the cup 71 rests at one end against this part of the wall of the duct M and, at the other end, against the flange 74, to automatically return the latter on to its seat as the thermostatic element 7 contracts.

Thus, as long as the temperature of the fluid discharged by the discharge duct M remains below or equal to the predetermined set temperature, the bypass is shut off by the flange 74, forming a shut-off element, of the thermostatic element 7 of the shut-off device, which flange is pressed against its seat; however, when the temperature of the fluid exceeds the set temperature, the piston 72 itself being stressed, the shut-off element lifts off its seat and fluid from the first duct F flows, by way of additional flow, towards the discharge duct M through the bypass around the cylinder/boot assembly and the flange, thus cooling the fluid discharged from the cartridge and therefore from the tap; the thermostatic element then stabilizes in a position of equilibrium which induces a temperature slightly higher (by a few degrees) than the predetermined set temperature.

In the embodiment of FIG. 5, in which elements which correspond to elements visible in FIGS. 1 to 4 bear the same numerical references, the cartridge is made in two parts, namely a part consisting of a conventional cartridge without a bypass or thermostatic element, and a temperature-limiting adapter comprising the bypass and the thermostatic element.

In this embodiment, the body 1A forming the housing of the conventional cartridge consists of a skirt 11A and a stopper 12, and the body 1B forming the housing of the adapter consists of a skirt 113 into which the skirt 11A of the conventional cartridge is fitted, to form the body 1 of the cartridge according to the invention. A first inlet duct F designed to convey so-called cold water, a second inlet duct C designed to convey so-called hot water and a discharge duct M for discharging so-called mixed water pass right through the skirt 11B. When the adapter is fixed to the conventional cartridge, the ducts F, C, M of the adapter and the ducts F, C, M of the conventional cartridge are respectively in the continuation of one another; here too, the ducts F, C, M defined in the skirts 11A, 115 by appropriately located internal partitions thereof, extend in the direction of the longitudinal central axis of the skirt, and open at the end of each skirt in one and the same plane perpendicular to this axis, embodied by the edge faces of the partitions defining the ducts.

Sealing between the conventional cartridge and the adapter is provided by O-rings housed in grooves cut in the edge faces of the partitions of the skirt 11A of the conventional cartridge, which face the edge faces of the partitions of the skirt 115 of the adapter, and extend circumferentially. To improve the relative centring of the two skirts, the edge face of the partition surrounding the discharge duct M, for example of the skirt 11A of the conventional cartridge may have an additional groove extending circumferentially, and the edge face of the partition surrounding the discharge duct of the skirt 11B of the adapter may have a circumferential projection designed to fit into this groove; sealing is then provided by an O-ring near the discharge duct M (on the inside of the additional groove), an O-ring on the outside of the additional groove, and an O-ring surrounding all three ducts.

As that part of the conventional cartridge depicted in FIG. 5 which extends from the stationary disc 3 to the free ends of the pivoting thrust bearing 6 and of the lever 2 is identical to the corresponding part of the cartridge depicted in FIGS. 1 to 4, it is not described again. The internal structure of the adapter is approximately identical to that of the part of the cartridge according to the invention depicted in FIGS. 1 to 4 which extends below the stationary disc 3 and thus also will not be described in detail; it will simply be noted that the adapter which converts the conventional cartridge into a cartridge according to the invention comprises a bypass B connecting the first cold water inlet duct F and the mixed water discharge duct M and is equipped with a device for shutting off the bypass, which device comprises a thermostatic element 7 identical to the one already described, mounted in the same way and operating identically.

The alternative form in FIG. 6 corresponds to a scenario in which it proves necessary for the bypass B to have a diameter appreciably greater than that of the cylinder/boot assembly of the thermostatic element 7; in such a case, the diameter of the flange 74 is generally of the same order as that of the bypass or even smaller. In this case then, the shut-off device does not, by way of a shut-off element, use the flange 74 of the thermostatic element but uses a separate shut-off element 9 consisting of a cup washer slipped around the cup 71, the cup of which washer acts as a housing for the flange 74, and of which the face facing the bypass has a frustoconical or spherical chamfer designed to press against the frustoconical or spherical region of the bypass B; in this embodiment, the elastic member 8 (helical spring) rests not against the flange 74, but against the shut-off element 9 consisting of the cup washer.

Figure 7:
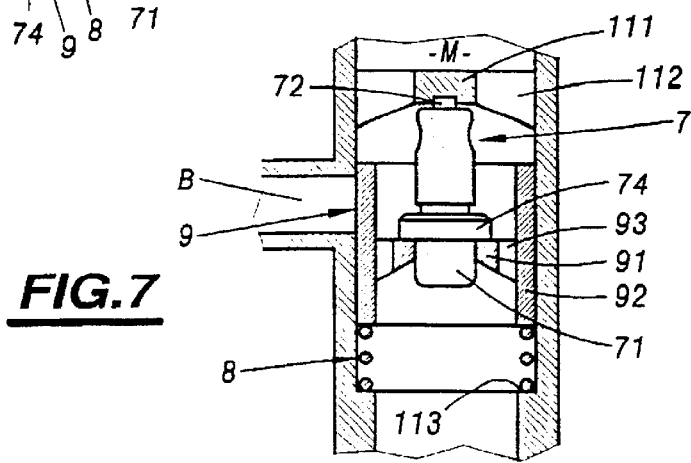

In the alternative form of FIG. 7, the shut-off device also comprises a wax-type thermostatic element 7 but the shut-off element 9 is of the plug type. The plug has two rings 91, 92 of cylindrical overall shape arranged concentrically and connected by one or more ribs 93 running radially; the inner ring 91 is slipped and fitted around the cup 71 of the thermostatic element, resting against the flange 74 thereof, and the outer ring 92 is designed to be a sliding fit in the discharge duct M in the region of the bypass B.

As, in this embodiment, the thermostatic element is fully housed in the discharge duct M, this duct has, on its inside, a central end stop 111 placed a few millimetres upstream of the bypass B and borne by one or more ribs 112 extending radially in the duct, and a shoulder 113 placed a few millimetres downstream of the bypass and facing in the upstream direction. The piston 72 of the thermostatic element 7 is placed so that it rests against the end stop 111, the location of this end stop 111 and the dimensions of the thermostatic element and of the plug being chosen so that as long as the predetermined set temperature is not exceeded, the outer ring 92 of the plug shuts off the bypass.

Like in the embodiments described previously, the shut-off device also has an elastic member 8 consisting of a helical spring, urging the shut-off element 9 into the position for closing the bypass, the spring 8 being slipped into the discharge duct M, one end resting against the shoulder 113 and the opposite end resting against the outer ring 92 of the plug.

As before, as long as the temperature of the water in the discharge duct M does not exceed the predetermined set temperature, the shut-off element 9 (and more specifically, in this instance, the outer ring 92 of the plug) shuts off the bypass, and when this temperature is exceeded, the shut-off element uncovers the bypass and a flow of water from the cold water inlet duct cools the discharged water, the equilibrium temperature being established a few degrees above the predetermined set temperature; when the temperature in the discharge duct M falls again, the shut-off element, urged by the spring 8, gradually returns to the position of shutting off the bypass.

Of course, the invention is not restricted to the reverse-flow single-control mixer cartridge embodiments described and depicted, and others may be envisaged without departing from its scope; in particular, embodiments may be envisaged in which the ducts are partially or completely shut off not by relative displacement of discs made, for example, of ceramic, but by the relative displacement of cylindrical surfaces, as in the case of piston-type mixers or spherical surfaces, as in the case of ball-type mixers, or others.

What is claimed is:

1. Cartridge for a reverse-flow mixer tap comprising a body (1; 1A, 1B) in which there terminate a first fluid inlet duct (F) for conveying fluid at a first temperature into the body, a second fluid inlet duct (C) for conveying fluid at a second temperature higher than the first temperature into the body, and a fluid discharge duct (M) for discharging fluid at a desired temperature in the range extending from the first temperature to the second temperature from the body, the cartridge being characterized in that it comprises a bypass (B) connecting the first inlet duct (F) to the discharge duct (M) and is equipped with a device (7, 8; 7, 8, 9) for shutting off the bypass comprising a thermostatic element (7) equipped with a shut-off element (74; 9) designed to shut off the bypass (B) as long as the temperature of the discharged fluid remains below or equal to a predetermined set temperature, and to uncover the bypass when the temperature of the discharged fluid exceeds this temperature, so as then to cause fluid to flow from the first inlet duct (F) to the discharge duct (M) through the bypass (B).

2. Cartridge for a mixer tap according to claim 1, characterized in that the first fluid inlet duct (F) for conveying fluid at a first temperature into the body and the fluid discharge type (M) for discharging fluid at a desired temperature from the body, extend in a first direction, and the bypass (B) extends in a direction perpendicular to this first direction.

3. Cartridge for a mixer tap according to claim 1, characterized in that the thermostatic element (7) comprises a flange (74) and this flange forms the shut-off element designed to shut off the bypass (B) as long as the temperature of the discharged fluid remains below or equal to a predetermined set temperature and to uncover the bypass when the temperature of the discharged fluid exceeds this temperature.

4. Cartridge for a mixer tap according to claim 1, characterized in that the shut-off device comprises a washer-shutter slipped around the thermostatic element (7), and this washer-shutter forms the shut-off element (9) designed to shut off the bypass (B) as long as the temperature of the discharged fluid remains below or equal to a predetermined set temperature, and to uncover the bypass when the temperature of the discharged fluid exceeds this temperature.

5. Cartridge for a mixer tap according to claim 1, characterized in that the shut-off device comprises a plug slipped around the thermostatic element (7), and this plug forms the shut-off element (9) designed to shut off the bypass (B) as long as the temperature of the discharged fluid remains below or equal to a predetermined set temperature, and to uncover the bypass when the temperature of the discharged fluid exceeds this temperature.

6. Cartridge for a mixer tap according to claim 1, characterized in that it comprises a body (1) forming a housing containing a skirt (11) into which there extend and in which there terminate the first inlet duct (F), the second inlet duct (C), and the discharge duct (M), along with the bypass (B) connecting the first inlet duct (F) and the discharge duct (M) and which is equipped with the device (7, 8; 7, 8, 9) for shutting off the bypass.

7. Cartridge for a mixer tap according to claim 1, characterized in that it comprises a conventional mixer tap cartridge without bypass or device for shutting off the bypass, comprising a housing (1A) and a temperature-limiting adapter comprising a housing (1B), and in that the body (1) forming a housing consists of the housing (1A) of the conventional cartridge and of the housing (1B) of the adapter consisting of a skirt (11B) through which the first inlet duct (F), the second inlet duct (C) and the discharge duct (M) pass, these ducts terminating in the housing (1A) of the conventional cartridge, and in that the adapter also comprises the bypass (B) connecting the first inlet duct (F) and the discharge duct (M) and is equipped with the device (7, 8; 7, 8, 9) for shutting off the bypass.

8. Cartridge for a mixer tap according to claim 1, characterized in that it is of the disc type, for example having ceramic discs.

9. Cartridge for a mixer tap according to claim 1, characterized in that it is of the type with cylindrical surfaces, the cartridge being of the piston type.

10. Cartridge for a mixer tap according to claim 1, characterized in that it is of the type with spherical surfaces, the cartridge being of the ball type.

11. Cartridge for a mixer tap according to claim 2, characterized in that the thermostatic element (7) comprises a flange (74) and this flange forms the shut-off element designed to shut off the bypass (B) as long as the temperature of the discharged fluid remains below or equal to a predetermined set temperature and to uncover the bypass when the temperature of the discharged fluid exceeds this temperature.

12. Cartridge for a mixer tap according to claim 2, characterized in that the shut-off device comprises a washer-shutter slipped around the thermostatic element (7), and this washer-shutter forms the shut-off element (9) designed to shut off the bypass (B) as long as the temperature of the discharged fluid remains below or equal to a predetermined set temperature, and to uncover the bypass when the temperature of the discharged fluid exceeds this temperature.

13. Cartridge for a mixer tap according to claim 2, characterized in that the shut-off device comprises a plug slipped around the thermostatic element (7), and this plug forms the shut-off element (9) designed to shut off the bypass (B) as long as the temperature of the discharged fluid remains below or equal to a predetermined set temperature, and to uncover the bypass when the temperature of the discharged fluid exceeds this temperature.

14. Cartridge for a mixer tap according to claim 2, characterized in that it comprises a body (1) forming a housing containing a skirt (11) into which there extend and in which there terminate the first inlet duct (F), the second inlet duct (C), and the discharge duct (M), along with the bypass (B) connecting the first inlet duct (F) and the discharge duct (M) and which is equipped with the device (7, 8; 7, 8, 9) for shutting off the bypass.

15. Cartridge for a mixer tap according to claim 3, characterized in that it comprises a body (1) forming a housing containing a skirt (11) into which there extend and in which there terminate the first inlet duct (F), the second inlet duct (C), and the discharge duct (M), along with the bypass (B) connecting the first inlet duct (F) and the discharge duct (M) and which is equipped with the device (7, 8; 7, 8, 9) for shutting off the bypass.

16. Cartridge for a mixer tap according to claim 4, characterized in that it comprises a body (1) forming a housing containing a skirt (11) into which there extend and in which there terminate the first inlet duct (F), the second inlet duct (C), and the discharge duct (M), along with the bypass (B) connecting the first inlet duct (F) and the discharge duct (M) and which is equipped with the device (7, 8; 7, 8, 9) for shutting off the bypass.

17. Cartridge for a mixer tap according to claim 5, characterized in that it comprises a body (1) forming a housing containing a skirt (11) into which there extend and in which there terminate the first inlet duct (F), the second inlet duct (C), and the discharge duct (M), along with the bypass (B) connecting the first inlet duct (F) and the discharge duct (M) and which is equipped with the device (7, 8; 7, 8, 9) for shutting off the bypass.

18. Cartridge for a mixer tap according to claim 2, characterized in that it comprises a conventional mixer tap cartridge without bypass or device for shutting off the bypass, comprising a housing (1A) and a temperature-limiting adapter comprising a housing (1B), and in that the body (1) forming a housing consists of the housing (1A) of the conventional cartridge and of the housing (1B) of the adapter consisting of a skirt (11B) through which the first inlet duct (F), the second inlet duct (C) and the discharge duct (M) pass, these ducts terminating in the housing (1A) of the conventional cartridge, and in that the adapter also comprises the bypass (B) connecting the first inlet duct (F) and the discharge duct (M) and is equipped with the device (7, 8; 7, 8, 9) for shutting off the bypass.

19. Cartridge for a mixer tap according to claim 3, characterized in that it comprises a conventional mixer tap cartridge without bypass or device for shutting off the bypass, comprising a housing (1A) and a temperature-limiting adapter comprising a housing (1B), and in that the body (1) forming a housing consists of the housing (1A) of the conventional cartridge and of the housing (1B) of the adapter consisting of a skirt (11B) through which the first inlet duct (F), the second inlet duct (C) and the discharge duct (M) pass, these ducts terminating in the housing (1A) of the conventional cartridge, and in that the adapter also comprises the bypass (B) connecting the first inlet duct (F) and the discharge duct (M) and is equipped with the device (7, 8; 7, 8, 9) for shutting off the bypass.

20. Cartridge for a mixer tap according to claim 4, characterized in that it comprises a conventional mixer tap cartridge without bypass or device for shutting off the bypass, comprising a housing (1A) and a temperature-limiting adapter comprising a housing (1B), and in that the body (1) forming a housing consists of the housing (1A) of the conventional cartridge and of the housing (1B) of the adapter consisting of a skirt (11B) through which the first inlet duct (F), the second inlet duct (C) and the discharge duct (M) pass, these ducts terminating in the housing (1A) of the conventional cartridge, and in that the adapter also comprises the bypass (B) connecting the first inlet duct (F) and the discharge duct (M) and is equipped with the device (7, 8; 7, 8, 9) for shutting off the bypass.

21. Cartridge for a mixer tap according to claim 5, characterized in that it comprises a conventional mixer tap cartridge without bypass or device for shutting off the bypass, comprising a housing (1A) and a temperature-limiting adapter comprising a housing (1B), and in that the body (1) forming a housing consists of the housing (1A) of the conventional cartridge and of the housing (1B) of the adapter consisting of a skirt (11B) through which the first inlet duct (F), the second inlet duct (C) and the discharge duct (M) pass, these ducts terminating in the housing (1A) of the conventional cartridge, and in that the adapter also comprises the bypass (B) connecting the first inlet duct (F) and the discharge duct (M) and is equipped with the device (7, 8; 7, 8, 9) for shutting off the bypass.

22. Cartridge for a mixer tap according to claim 2, characterized in that it is of the disc type, for example having ceramic discs.

23. Cartridge for a mixer tap according to claim 3, characterized in that it is of the disc type, for example having ceramic discs.

24. Cartridge for a mixer tap according to claim 4, characterized in that it is of the disc type, for example having ceramic discs.

25. Cartridge for a mixer tap according to claim 5, characterized in that it is of the disc type, for example having ceramic discs.

26. Cartridge for a mixer tap according to claim 6, characterized in that it is of the disc type, for example having ceramic discs.

27. Cartridge for a mixer tap according to claim 7, characterized in that it is of the disc type, for example having ceramic discs.

28. Cartridge for a mixer tap according to claim 2, characterized in that it is of the type with cylindrical surfaces, the cartridge being of the piston type.

29. Cartridge for a mixer tap according to claim 3, characterized in that it is of the type with cylindrical surfaces, the cartridge being of the piston type.

30. Cartridge for a mixer tap according to claim 4, characterized in that it is of the type with cylindrical surfaces, the cartridge being of the piston type.

31. Cartridge for a mixer tap according to claim 5, characterized in that it is of the type with cylindrical surfaces, the cartridge being of the piston type.

32. Cartridge for a mixer tap according to claim 6, characterized in that it is of the type with cylindrical surfaces, the cartridge being of the piston type.

33. Cartridge for a mixer tap according to claim 7, characterized in that it is of the type with cylindrical surfaces, the cartridge being of the piston type.

34. Cartridge for a mixer tap according to claim 2, characterized in that it is of the type with spherical surfaces, the cartridge being of the ball type.

35. Cartridge for a mixer tap according to claim 3, characterized in that it is of the type with spherical surfaces, the cartridge being of the ball type.

36. Cartridge for a mixer tap according to claim 4, characterized in that it is of the type with spherical surfaces, the cartridge being of the ball type.

37. Cartridge for a mixer tap according to claim 5, characterized in that it is of the type with spherical surfaces, the cartridge being of the ball type.

38. Cartridge for a mixer tap according to claim 6, characterized in that it is of the type with spherical surfaces, the cartridge being of the ball type.

39. Cartridge for a mixer tap according to claim 7, characterized in that it is of the type with spherical surfaces, the cartridge being of the ball type.

* * * * *